(No Model.)

T. M. KENNEY.
WHEEL.

No. 437,998. Patented Oct. 7, 1890.

Witnesses:
Walter E. Lombard
Colbert A. McClure.

Inventor:
Thomas M. Kenney,
by N. C. Lombard
Attorney.

THE NORRIS PETERS CO., PHOTO-LITHO., WASHINGTON, D. C.

United States Patent Office.

THOMAS M. KENNEY, OF CAMBRIDGE, MASSACHUSETTS, ASSIGNOR OF ONE-HALF TO CHARLES BULLOCK, OF SAME PLACE.

WHEEL.

SPECIFICATION forming part of Letters Patent No. 437,998, dated October 7, 1890.

Application filed June 12, 1890. Serial No. 355,136. (No model.)

*To all whom it may concern:*

Be it known that I, THOMAS M. KENNEY, of Cambridge, in the county of Middlesex and State of Massachusetts, have invented a new and useful Improvement in Vehicle-Wheels, of which the following, taken in connection with the accompanying drawings, is a specification.

My invention relates to vehicle-wheels, and more especially to that class of wheels which have rubber tires; and it consists in certain novel features of construction, arrangement and combination of parts, which will be readily understood by reference to the description of the drawings and to the claims hereinafter given, and in which my invention is clearly pointed out.

Figure 1:
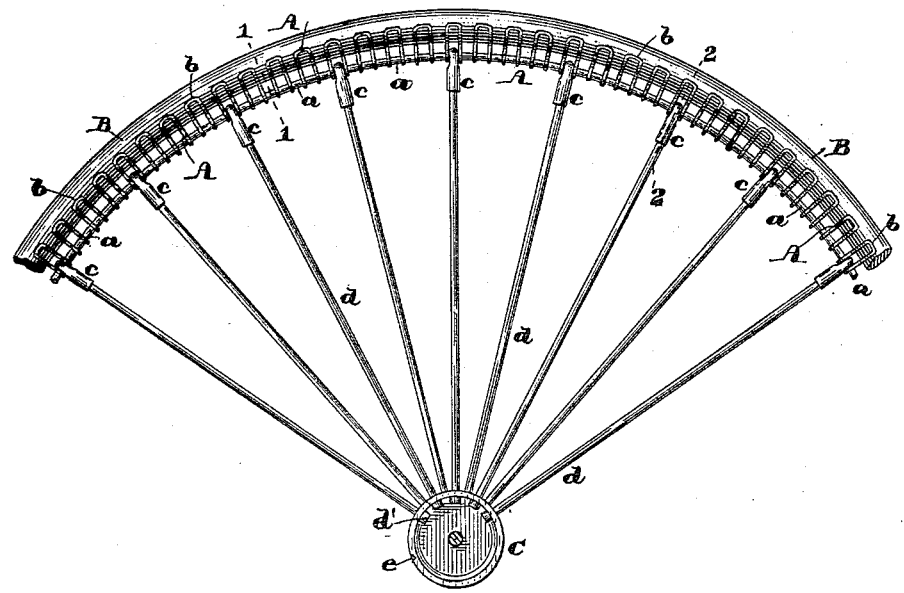
Figure 2:
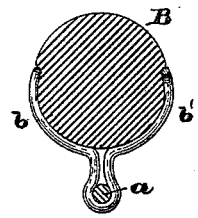
Figure 3:
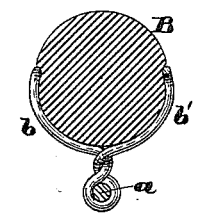
Figure 4:
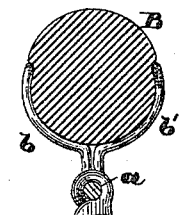
Figure 6:
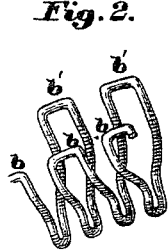
Figure 5:
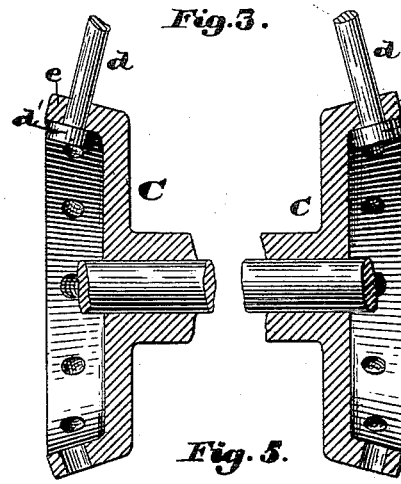

Figure 1 of the drawings is an elevation of a section of a wheel embodying my invention. Fig. 2 is a transverse section of the felly and tire on line 1 1 on Fig. 1. Fig. 3 is a similar section illustrating another way of forming the skeleton felly. Fig. 4 is a section through the felly and tire and one of the spoke-sockets on line 2 2 on Fig. 1, and illustrates the manner of connecting the outer ends of the spokes to the felly. Fig. 5 is a central longitudinal section of the wheel-hub. Fig. 6 is a perspective view of a few of the tire-supporting loops detached. Fig. 1 is drawn to a scale one-quarter of the scale of Figs. 2, 3, 4, 5, and 6.

Heretofore, so far as I am aware, wheels having rubber tires have been constructed with rolled rims or fellies having a concavo-convex cross-section of uniform shape throughout their entire circumference, and presenting semi-circular grooves in their peripheries to receive the rubber tire, the walls of which grooves are continuous or unbroken and bear upon the whole area of the inner half of said tire both transversely and in the direction of its length.

In the drawings forming a part of this application and illustrating my invention, the felly or tire-supporting rim A is a skeleton-like structure, made entirely of steel wire, and consists of the endless-wire hoop $a$ and two series of upwardly-projecting loops $b\ b'$, all formed from a single wire, which is wound partly around the wire $a$, then bent upward and outward toward the right of Figs. 2, 3, and 4, then in the direction of the circumference of the wheel, then downward or toward the center of the wheel and inward toward the wire $a$ to form a loop $b$, then around the wire $a$ upward and outward circumferentially, then downward and inward toward the wire $a$ to form the loop $b'$, and so on, repeating the above operation until the felly or rim is complete.

The loops $b$ and $b'$ are curved laterally in opposite directions to arcs of circles, so as to form semicircular seats or supports for the rubber tire B, which is made as an endless ring or hoop of rubber having a circular cross-section in the usual manner.

The wire which forms the loops $b$ and $b'$ is firmly soldered or brazed to the wire ring $a$ at each point where it is wound around or partially around said wire, thus firmly securing the two wires together to form an endless-wheel rim or felly of ample strength but of a somewhat springy or yielding nature.

At proper and equal intervals I mount on the wire $a$ a series of threaded sockets $c\ c$, which are also firmly secured to said wire $a$ by soldering or brazing.

The spokes $d\ d$ are each provided at their inner ends with a head $d'$, which bears against the inner surface of the annular flange $e$ of the hub C, and each has formed on its outer end a male screw-thread $d^2$, by means of which it is connected to the socket $c$, as shown in Figs. 1 and 4. By this construction the weight of the wheel is materially reduced, the cost of manufacture lessened, and, by virtue of the skeleton form of the rim or felly, the rubber tire, while being held firmly in its place, does not have a bearing on the felly in all parts of its inner surface, and hence is left free to expand laterally between the wires of the loops $b\ b$, as said tire is compressed vertically at its bearing-point when a load is placed thereon, which, together with the elasticity of said loops themselves, renders the wheel much more elastic, and, as a consequence, more comfortable to ride upon than the rubber-tired wheel now in general use, and it reduces the strain upon the machine just in proportion to its increased elasticity.

I am aware of the Letters Patent Nos. 92,606, 193,988, and 264,133, granted, respectively, July 13, 1869, August 7, 1877, and September 12, 1882, and I do not claim anything shown or described in said patents.

What I claim as new, and desire to secure by Letters Patent of the United States, is—

1. A vehicle-wheel provided with a tire of rubber or other elastic material and having a rim or felly for supporting said tire made entirely of wire.

2. The combination, in a vehicle-wheel, of an elastic tire having a circular or nearly circular cross-section, and a rim or felly provided with a circumferential groove the walls of which are curved transversely to fit the semicircular inner surface of the tire, said tire being made of skeleton form or provided with a series of openings through which said tire may expand toward the axis of the wheel.

3. In a vehicle-wheel having an elastic tire, a rim or felly for supporting said tire, composed of the endless-wire hoop or ring $a$ and two series of loops $b\ b'$, curved to arcs of circles in opposite directions, and all formed from a single wire and connected to the wire $a$ by being wound partially or entirely around said wire and soldered or brazed thereto.

4. In a vehicle-wheel, the combination of the tire B, the felly A, composed of the endless-wire hoop $a$ and the two series of loops $b$ and $b'$, connected thereto and curved in opposite directions, the series of sockets $c\ c$, mounted upon and secured to said hoop $a$, the hub C, and the spokes $d\ d$, each provided with a head $d'$ at one end and having its other end screwed into a socket $c$, substantially as described.

In testimony whereof I have signed my name to this specification, in the presence of two subscribing witnesses, on this 9th day of June, A. D. 1890.

THOMAS M. KENNEY.

Witnesses:
N. C. LOMBARD,
MARY E. KENNEY.